United States Patent
Nagashima et al.

[11] Patent Number: 6,014,361
[45] Date of Patent: Jan. 11, 2000

[54] BEAM EXPANDER TO CHANGE AN ELLIPTICAL LIGHT BEAM EMITTED FROM A LASER SOURCE TO A CIRCULAR LIGHT BEAM

[75] Inventors: Kenji Nagashima, Suita; Akihiro Sakaguchi, Kawachinagano; Hiroshi Gotou, Munakata; Youichi Saitou, Hirakata, all of Japan

[73] Assignee: Matushita Electric Industrial Co., Ltd., Osaka, Japan

[21] Appl. No.: 09/057,915

[22] Filed: Apr. 9, 1998

[30] Foreign Application Priority Data

Apr. 11, 1997 [JP] Japan .................................. 9-093522

[51] Int. Cl.[7] .................................................. G11B 7/135
[52] U.S. Cl. .......................................... 369/112; 369/44.23
[58] Field of Search ................................. 369/112, 44.24, 369/44.12, 44.23, 110, 109

[56] References Cited

U.S. PATENT DOCUMENTS 5,107,477  4/1992  Fujita et al. .......................... 369/44.24
5,132,959  7/1992  Ishika .................................... 369/112
5,761,177  6/1998  Muneyoshi et al. .................. 369/112

*Primary Examiner*—John W. Cabeca
*Assistant Examiner*—Kim-Kwok Chu
*Attorney, Agent, or Firm*—Ratner & Prestia

[57] ABSTRACT

An optical head device of the present invention includes: a semiconductor laser for emitting a light beam; a first optical element for converting the light beam emitted from the semiconductor laser into collimated light having an elliptic beam shape; shaping means for shaping the beam shape of the collimated light from an ellipse to a circle; and a second optical element for directing the collimated light having the beam shape which has been shaped into a circle onto an optical information recording medium. The semiconductor laser is located so that a short axis direction of the ellipse is substantially parallel to a rotation axis direction of the optical information recording medium.

5 Claims, 7 Drawing Sheets

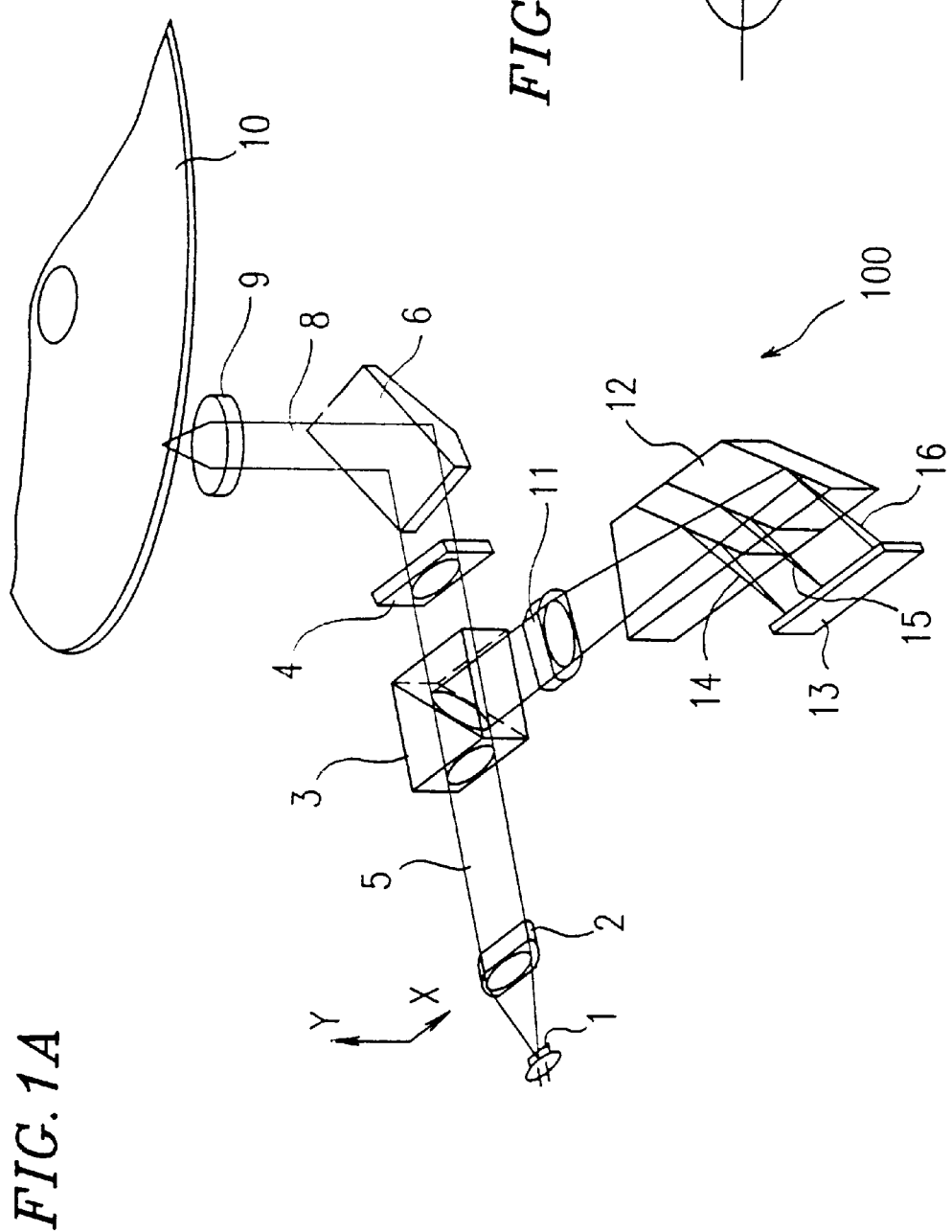
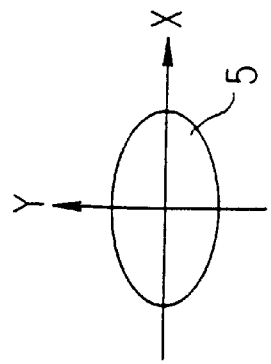

BEAM EXPANDER TO CHANGE AN ELLIPTICAL LIGHT BEAM EMITTED FROM A LASER SOURCE TO A CIRCULAR LIGHT BEAM

BACKGROUND OF THE INVENTION

1. Field of the Invention

The present invention relates to an optical head device for recording and reproducing information to/from an optical information recording medium.

2. Description of the Related Art

In order to meet the demand for a smaller optical disk apparatus for recording and reproducing information using laser light, it has conventionally been attempted to reduce the size and weight of the optical head. A typical example of such an apparatus is an optical disk apparatus for recording and reproducing information to/from a disk using a semiconductor laser. Such an apparatus requires a light beam to have a circular isointensity line shape in order to improve the light efficiency and/or to obtain a light spot with an axially-symmetrical intensity distribution. Hereinafter, in this specification, the isointensity line shape will be referred to as the "beam shape".

In general, when a light beam emitted from a semiconductor laser is collimated into collimated light with a collimator lens, the collimated light will have an elliptic beam shape. This is due to the difference between the radiation angle of the light beam along the P-N junction (i.e., the horizontal direction) of the semiconductor laser and that of the light beam along the direction vertical to the P-N junction of the semiconductor laser. Therefore, it has been conventionally proposed to provide an optical system for shaping the elliptic collimated light into circular collimated light.

FIG. 7 illustrates a structure of a conventional optical head device. A laser diode 23 as a laser light source emits a linearly-polarized light beam. The light beam emitted from the laser diode 23 is converted by a collimator lens 24 into collimated light having an elliptic beam shape. The laser diode 23 is located so that the long axis of the ellipse is substantially parallel to the thickness direction of the optical head device (i.e., the rotation axis of an optical information recording medium 31).

The collimated light having an elliptic beam shape is expanded in the horizontal direction by beam shaping prisms 25 and 26 so as to be shaped into a circular beam. The circular beam passes through a polarization beam splitter 27 and a λ/4 plate 28, and is then incident upon a deflection mirror 29. The polarization of the circular beam is converted by the λ/4 plate 28 from the linear polarization to the circular polarization. Thereafter, the circular beam is deflected by the deflection mirror 29 so as to direct the optical path thereof vertically toward the optical information recording medium 31. The beam is then converged by an objective lens 30 and is illuminated onto the optical information recording medium 31. The light converged by the objective lens 30 forms a tiny light spot on a surface of the optical information recording medium 31. Such a light spot enables the recording and erasing of information to/from the optical information recording medium 31.

The reflected light beam from the optical information recording medium 31 travels along a path in reverse to that of the light beam emitted from the laser diode 23, and passes through the λ/4 plate 28 again. The polarization of the light beam is converted by the λ/4 plate 28 from the circularly polarized to the linearly polarized. The polarization direction of the linearly-polarized light is perpendicular to the polarization direction of the light beam emitted from the laser diode 23.

The light beam having passed through the λ/4 plate 28 is reflected by the polarization beam splitter 27, thereby diverging from the optical path of the light beam emitted from the laser diode 23. Then, the light beam is converged by a detection lens 32 onto a signal detection prism 33.

Two light beams 35 and 36 partially reflected by the signal detection prism 33 and a light beam 37 totally reflected by the signal detection prism 33 are guided to a photodetector 34. The photodetector 34 is used to detect a focusing error signal FE, a tracking error signal TE and an information signal RF. For example, the focusing error signal FE is detected by the known spot size detection method (SSD), while the tracking error signal TE is detected by the known push-pull detection method. The information signal RF is detected based on the sum signal obtained from respective detected signals. The information signal RF represents a data signal recorded on the optical information recording medium 31.

FIG. 8 illustrates light receiving areas of the photodetector 34. The photodetector 34 has light receiving areas 34a to 34d for receiving circular beams. Circular light spots 38 and 39 are illuminated onto the light receiving areas 34d and 34c, respectively, while a circular light spot 40 is illuminated onto the light receiving areas 34a and 34b.

The light spots 38, 39 and 40 respectively correspond to the light beams 35, 36 and 37 resulting when the light spot on the optical information recording medium 31 is minimally small. The photodetector 34 is located between the respective focal points of the light beams 35 and 36 so that the light spot 38 is a near-field image pattern while the light spots 39 and 40 are each a far-field image pattern.

When signals detected by the light receiving areas 34a to 34d of the photodetector 34 are represented by $S_a$ to $S_d$, respectively, the signals FE, TE and RF are expressed by Expressions (1) to (3) below, respectively.

$$FE = S_c - S_d \qquad (1)$$

$$TE = S_a - S_b \qquad (2)$$

$$RF = S_a + S_b + S_c + S_d \qquad (3)$$

In the above conventional example, the vertical thickness of the optical disk is limited by the size of the laser spot at the objective lens, whereby it is difficult to reduce the thickness of the optical head device. Moreover, in order to maintain the sensitivity of the focusing error signal FE, the distance between the detection lens 32 and the photodetector 34, as shown in FIG. 7, is limited, whereby it is difficult to reduce the size of the optical head device.

SUMMARY OF THE INVENTION

According to one aspect of this invention, an optical head device includes: a semiconductor laser for emitting a light beam; a first optical element for converting the light beam emitted from the semiconductor laser into collimated light having an elliptic beam shape; shaping means for shaping the beam shape of the collimated light from an ellipse to a circle; and a second optical element for directing the collimated light having the beam shape which has been shaped into a circle onto an optical information recording medium. The semiconductor laser is located so that a short axis direction of the ellipse is substantially parallel to a rotation axis direction of the optical information recording medium.

In one embodiment of the invention, the shaping means is an optical element having functions of: changing a direction of incident light so that an optical axis of an exiting light is perpendicular to an optical axis of the incident light; and shaping the beam shape of the incident light.

In another embodiment of the invention, the shaping means is located so that both of the light beam emitted from the semiconductor laser and a reflected light beam from the optical information recording medium pass through the shaping means.

In still another embodiment of the invention, the shaping means shapes a beam shape of a reflected light beam from the optical information recording medium from a circle to an ellipse, with the short axis direction of the ellipse being substantially parallel to the rotation axis direction of the optical information recording medium.

In still another embodiment of the invention, the optical head device further includes a photodetector for receiving a light beam having a beam shape which has been shaped into an ellipse, and the photodetector has a light receiving area extending along a long axis direction of the ellipse.

Thus, the invention described herein makes possible the advantage of providing an optical head device which can be made smaller by reducing the dimension in the direction vertical to the information surface of an optical disk (i.e., the thickness direction of the optical head device).

This and other advantages of the present invention will become apparent to those skilled in the art upon reading and understanding the following detailed description with reference to the accompanying figures.

BRIEF DESCRIPTION OF THE DRAWINGS

FIG. 1A is a perspective view illustrating a structure of an optical head device 100 of the present invention.

FIG. 1B is a diagram illustrating an elliptic beam shape of collimated light 5.

DESCRIPTION OF THE PREFERRED EMBODIMENTS

Figure 2:
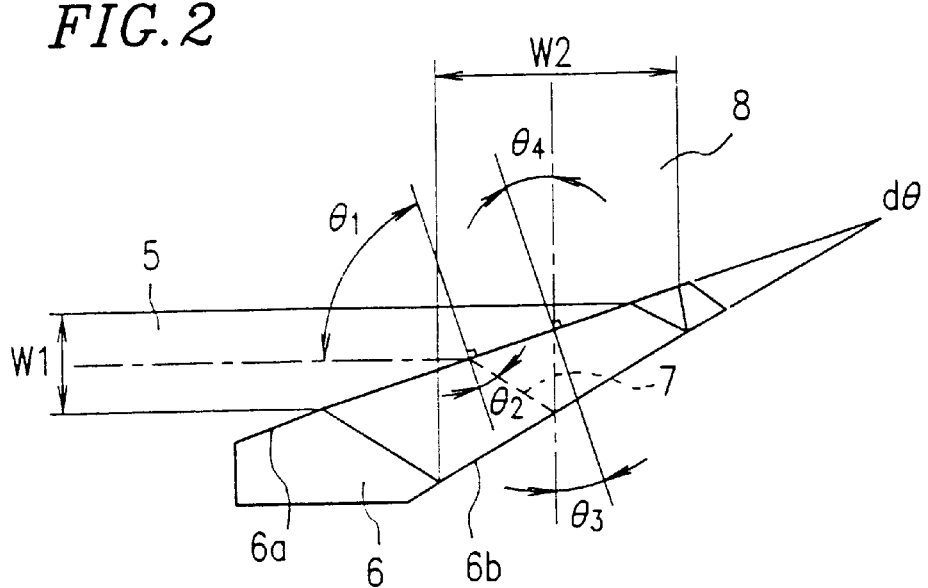
FIG. 2 is a diagram illustrating a cross section of a beam shaping prism 6.

Hereinafter, the present invention will be described by way of illustrative examples with reference to FIGS. 1A to 6.

EXAMPLE 1

FIG. 1A illustrates a structure of an optical head device 100 of the present invention. A laser diode 1 as a laser light source emits a linearly-polarized light beam. The linear polarization is, for example, P-polarization. The light beam emitted from the laser diode 1 is converted by a collimator lens 2 into collimated light 5 having an elliptic beam shape. The laser diode 1 is located so that the short axis of the ellipse is substantially parallel to the thickness direction of the optical head device 100 (i.e., the rotation axis of an optical information recording medium 10).

FIG. 1B illustrates the elliptic beam shape of the collimated light 5. The long and short axes of the ellipse respectively correspond to the X and Y axes. The rotation axis of the optical information recording medium 10 corresponds to the Y axis (see FIG. 1A). Hereinafter, the thickness direction of the optical head device 100 will be referred to also as the "vertical direction" of the optical head device 100.

The collimated light 5 having the elliptic beam shape passes through a polarization beam splitter 3 and a $\lambda/4$ plate 4, and is then incident upon a beam shaping prism 6. The polarization of the collimated light 5 is converted by the $\lambda/4$ plate 4, from the linear polarization to the circular polarization. The beam shaping prism 6 is an optical element having the functions of: changing the direction of incident light so that the optical axis of the exiting light is perpendicular to that of the incident light; and shaping the beam shape of the incident light. In the example illustrated in FIG. 1A, the beam shaping prism 6 is formed of a single prism element. However, the beam shaping prism 6 is not limited thereto. For example, the beam shaping prism 6 may also be an optical element of a plurality of prisms joined together.

FIG. 2 illustrates a cross section of the beam shaping prism 6 shown in FIG. 1A. As shown in FIG. 2, the beam shaping prism 6 has a refraction surface 6a and a reflection surface 6b opposing each other at angle $d\theta$. As the collimated light 5 is incident upon the refraction surface 6a at angle of incidence $\theta_1$, the incident light is refracted and exits at angle of emergence $\theta_2$ into the beam shaping prism 6 as collimated light 7.

The collimated light 7 is incident upon the reflection surface 6b at angle $\theta_2-d\theta$. The reflected light is again incident upon the refraction surface 6a from inside the beam shaping prism 6. The angle $\theta_3$ of this second incidence is $\theta_2-2d\theta$.

The angles $\theta_1$ and $d\theta$ are set so that collimated light 8 again exiting the refraction surface 6a forms the right angle with respect to the collimated light 5. Conditions for $\theta_1$ and $d\theta$ can be expressed by Expressions (4) and (5) below.

$$n \cdot \sin(\theta_2 - 2d\theta) = \sin(\pi/2 - \theta_1) \qquad (4)$$

where $$\theta_2 = \sin^{-1}(\sin\theta_1/n) \qquad (5)$$

Herein, n denotes the refractive index of the beam shaping prism 6.

Moreover, the beam expanding ratio K of the beam shaping prism 6 in the vertical direction is expressed by Expression (6) below.

$$K = W1/W2 = \cos\theta_2 \times \cos(\pi/2 - \theta_1)/\cos\theta_1 \times \cos(\theta_2 - 2d\theta) \qquad (6)$$

Herein, W1 denotes the width of the collimated light 5, and W2 denotes the width of the collimated light 8.

As is seen from Expression (6), it is possible, by appropriately setting the beam expanding ratio K, to shape the collimated light 5 having an elliptic beam shape into the collimated light 8 having a circular beam shape.

Thus, the collimated light 5 having the elliptic beam shape is converted into the collimated light 8 having the circular beam shape. The collimated light 8 is converged by an objective lens 9 and is directed onto the optical information recording medium 10. The light converged by the objective lens 9 forms a tiny light spot on a surface of the optical information recording medium 10. Such a light spot enables the recording and erasing of information to/from the optical information recording medium 10.

The reflected light beam from the optical information recording medium 10 travels along a path reverse to that of the light beam emitted from the laser diode 1, and is incident upon the beam shaping prism 6 again. Since the optical path of the reflected light from the optical information recording medium 10 is the reverse of that of the light beam emitted from the laser diode 1, the circular reflected light is shrunk by the beam shaping prism 6 in the vertical direction by a ratio of 1/K.

Thus, the beam shape of the reflected light beam from the optical information recording medium 10 is shaped by the beam shaping prism 6 from a circle into an ellipse. The short axis of the ellipse is substantially parallel to the rotation axis of the optical information recording medium 10. The beam shaping prism 6 is located so that both of the light beam emitted from the laser diode 1 and the reflected light beam from the optical information recording medium 10 pass therethrough.

The light beam having the beam shape which has been shaped into an ellipse passes through the λ/4 plate 4 again. The polarization of the light beam is converted by the λ/4 plate 4 from the circularly polarized to the linearly polarized. The polarization direction of the linear polarization is perpendicular to the polarization direction of the light beam emitted from the laser diode 1. For example, when the polarization direction of the light beam emitted from the laser diode 1 is P-polarization, the polarization direction of the light having passed through the λ/4 plate 4 is S-polarization.

The light beam having passed through the λ/4 plate 4 is reflected by the polarization beam splitter 3, thereby diverging from the optical path of the light beam emitted from the laser diode 1. Then, the light beam is converged by a detection lens 11 onto signal detection prism 12.

Two light beams 14 and 15 partially reflected by the signal detection prism 12 and a light beam 16 totally reflected by the signal detection prism 12 are guided to a photodetector 13. The photodetector 13 is used to detect a focusing error signal FE, a tracking error signal TE and an information signal RF. For example, the focusing error signal FE is detected by the known spot size detection method (SSD), while the tracking error signal TE is detected by the known push-pull detection method. The information signal RF is detected based on the sum signal obtained from respective detected signals. The information signal RF represents a data signal recorded on the optical information recording medium 10.

Figure 3:
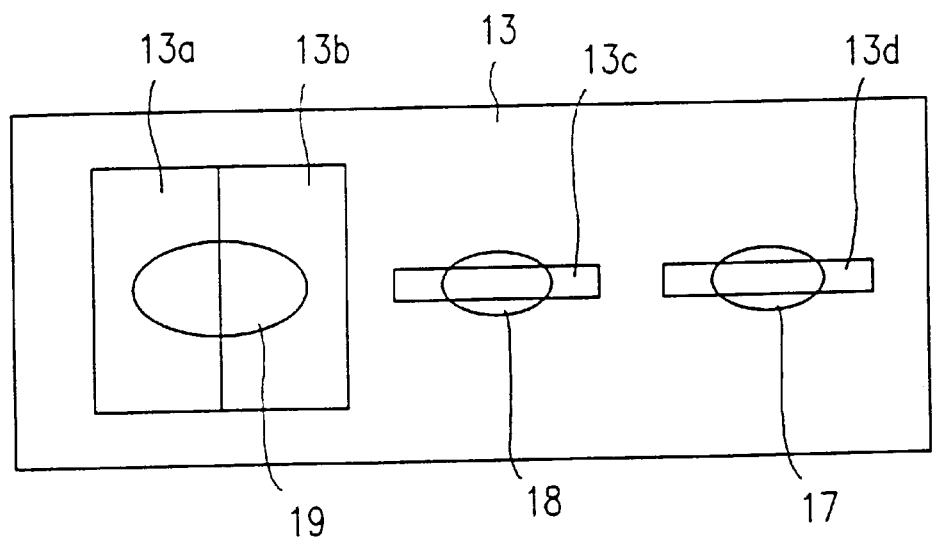
FIG. 3 is a diagram illustrating light receiving areas of a photodetector 13.

FIG. 3 illustrates light receiving areas of the photodetector 13. The photodetector 13 has light receiving areas 13a to 13d for receiving light beams each having the beam shape which has been shaped into an ellipse. An elliptic light spot 17 is illuminated onto the light receiving area 13d. The light receiving area 13d extends along the long axis of the ellipse of the light spot 17. In other words, the longitudinal direction of the light receiving area 13d corresponds to the long axis direction of the ellipse of the light spot 17. An elliptic light spot 18 is illuminated onto the light receiving area 13c. The light receiving area 13c extends along the long axis of the ellipse of the light spot 18. In other words, the longitudinal direction of the light receiving area 13c corresponds to the long axis direction of the ellipse of the light spot 18. An elliptic light spot 19 is illuminated onto the light receiving areas 13a and 13b.

The light spots 17, 18 and 19 respectively correspond to the light beams 14, 15 and 16 resulting when the light spot on the optical information recording medium 10 is minimally small. The photodetector 13 is located between the respective focal points of the light beams 14 and 15 so that the light spot 17 becomes a near-field image pattern while the light spots 18 and 19 each become a far-field image pattern.

When signals detected by the light receiving areas 13a to 13d of the photodetector 13 are represented by $S_a$ to $S_d$, respectively, the signals FE, TE and RF are expressed by Expressions (7) to (9) below, respectively.

$$FE = S_c - S_d \qquad (7)$$

$$TE = S_a - S_b \qquad (8)$$

$$RF = S_a + S_b + S_c + S_d \qquad (9)$$

In Example 1 described above, the focusing error signal FE is detected by the known spot size detection method. However, the focusing error signal FE can also be detected based on, instead of the spot size detection method, the known knife edge method as in Example 2 described below.

EXAMPLE 2

Figure 4:
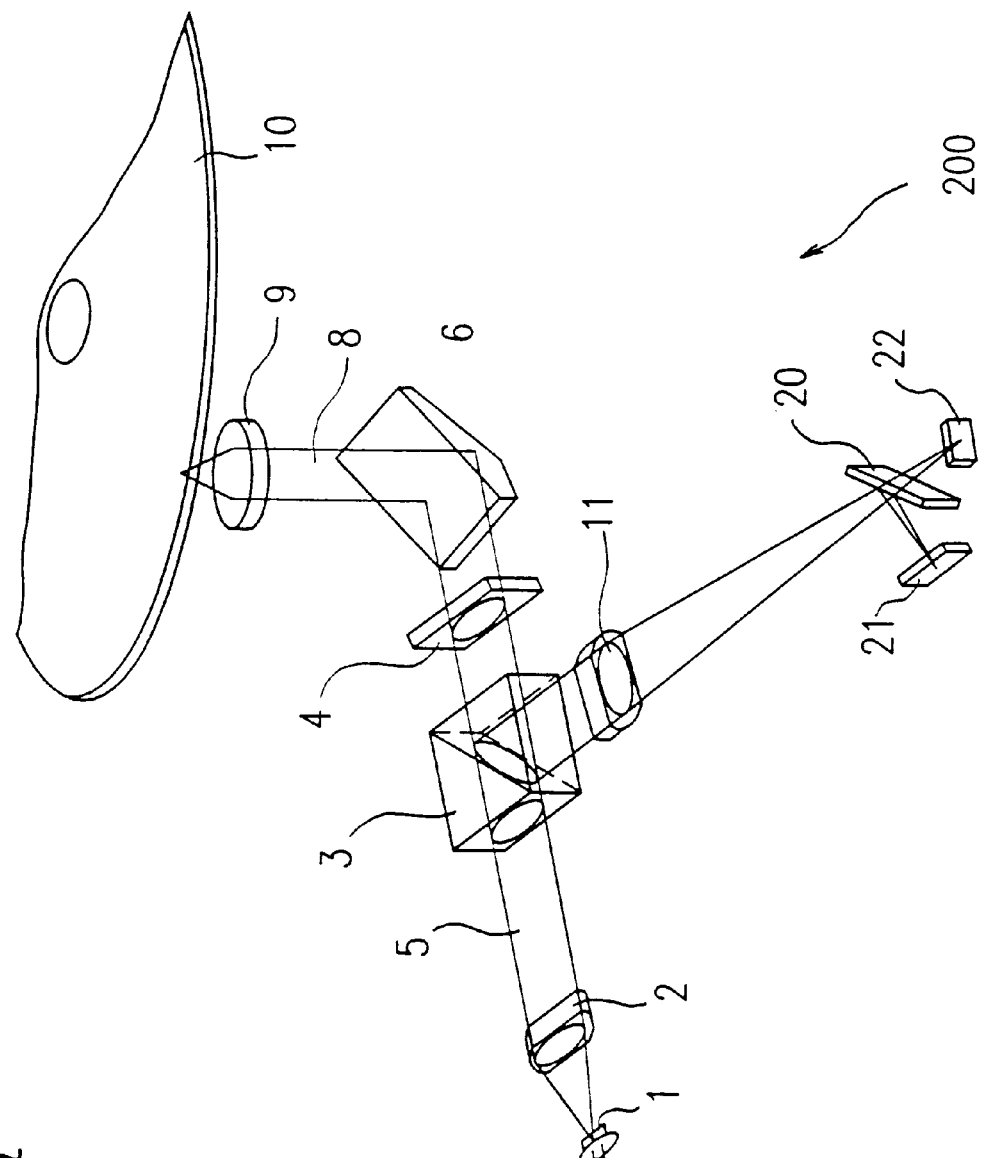
FIG. 4 is a perspective view illustrating a structure of an optical head device 200 of the present invention.

FIG. 4 illustrates a structure of an optical head device 200 of the present invention used in the case where the focusing error signal is detected by the knife edge method. In FIG. 4, elements corresponding to those shown in FIGS. 1A and 2 are denoted by the same reference numerals.

In the optical head device 200, reflected light from the optical information recording medium 10 travels along an optical path similar to that in the optical head device 100. That is, the reflected light passes through the objective lens 9, the beam shaping prism 6 and the λ/4 plate 4, and is reflected by the polarization beam splitter 3, thereby diverging from the optical path of the light beam emitted from the laser diode 1. Then, the light beam is converged by the detection lens 11.

A knife edge prism 20 deflects a portion of the light beam having passed through the detection lens 11 toward a detector 21 while transmitting the remaining portion thereof toward the detector 22. The detector 21 detects the tracking error signal TE by the known push-pull detection method. The detector 22 detects the focusing error signal FE by the known knife edge method.

Figure 5A:
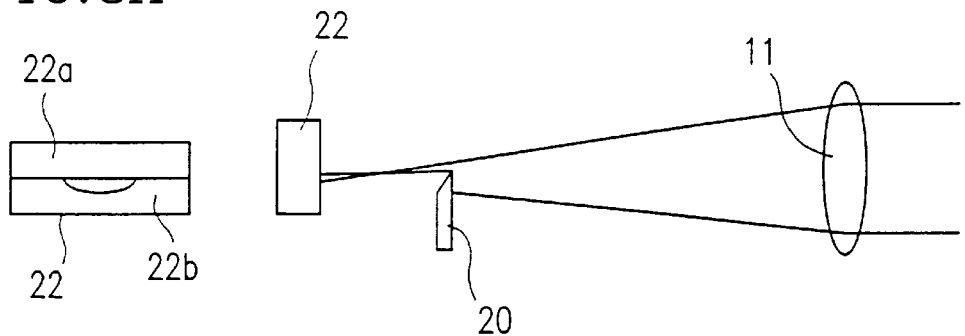
FIGS. 5A to 5C are diagrams illustrating different light spot shapes on light receiving areas 22a and 22b of a photodetector 22.
Figure 5B:
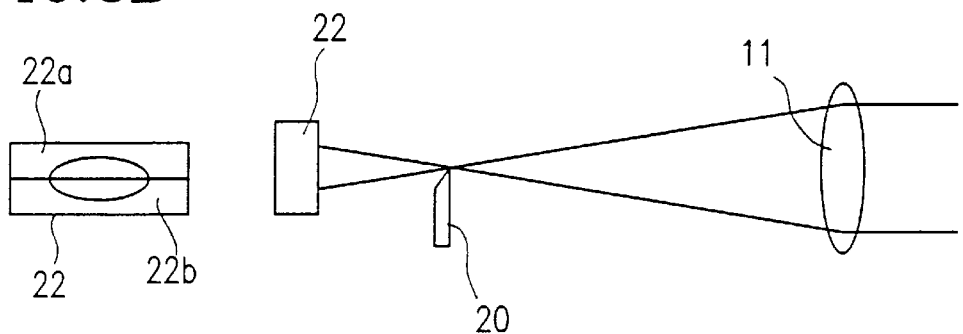
Figure 5C:
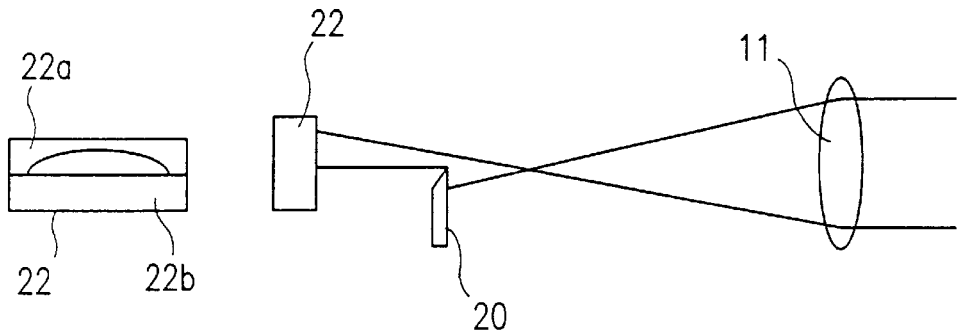

FIGS. 5A to 5C illustrate different light spot shapes on light receiving areas 22a and 22b of the photodetector 22. FIG. 5A illustrates the shape of a light spot resulting when the distance between the optical information recording medium 10 and the objective lens 9 is too short; FIG. 5B illustrates the shape of a light spot resulting when the light spot on the optical information recording medium 10 is minimally small; and FIG. 5C illustrates the shape of a light spot resulting when the distance between the optical information recording medium 10 and the objective lens 9 is too long. The knife edge prism 20 is located substantially at the focal position of the detection lens 11.

When signals detected by the light receiving areas 22a and 22b of the photodetector 22 are represented by $S_a$ and $S_b$, respectively, the signal FE is expressed by Expression (10) below.

$$FE = S_a - S_b \qquad (10)$$

The signals TE and RF can be detected in the same way as in Example 1.

Figure 6:
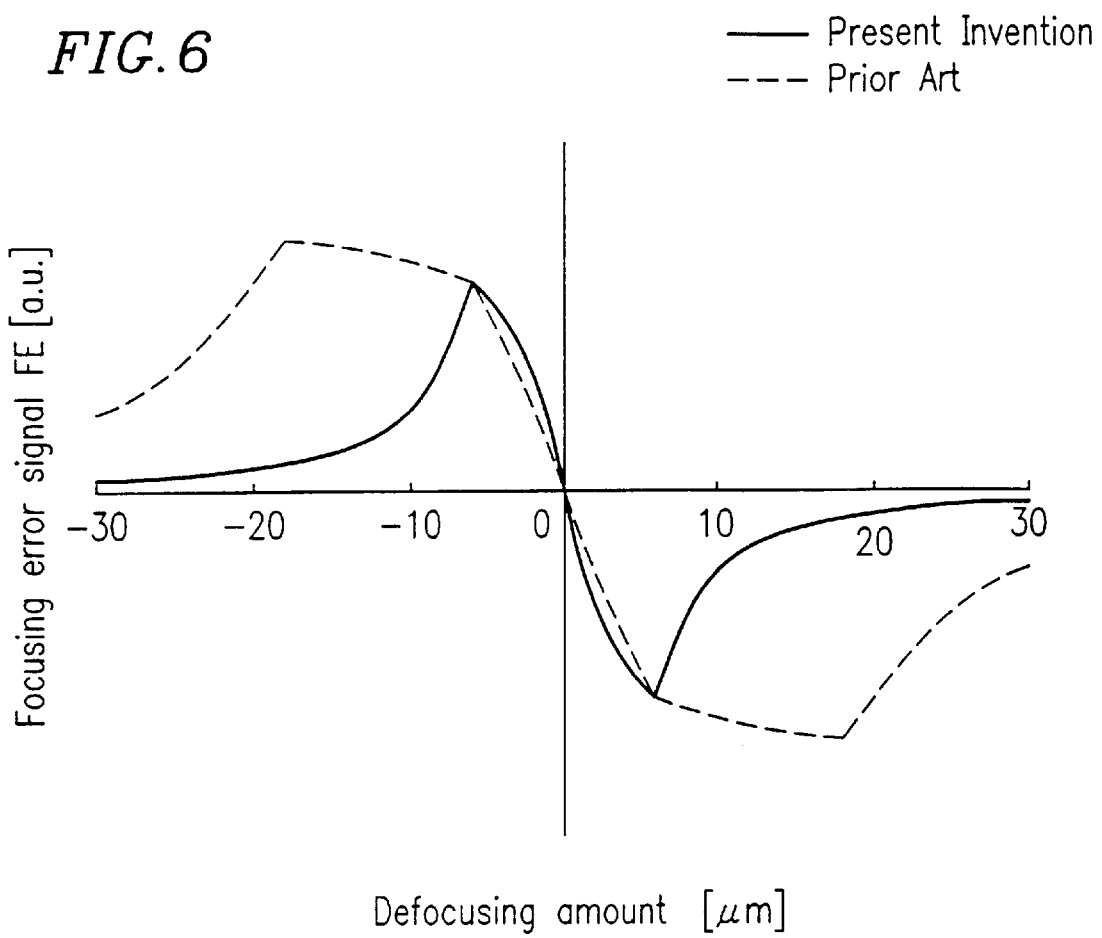
FIG. 6 is a graph comparing the defocusing characteristic of a focusing error signal FE in accordance with Example 1 of the present invention, with that of a focusing error signal FE in accordance with the conventional example.
Figure 7:
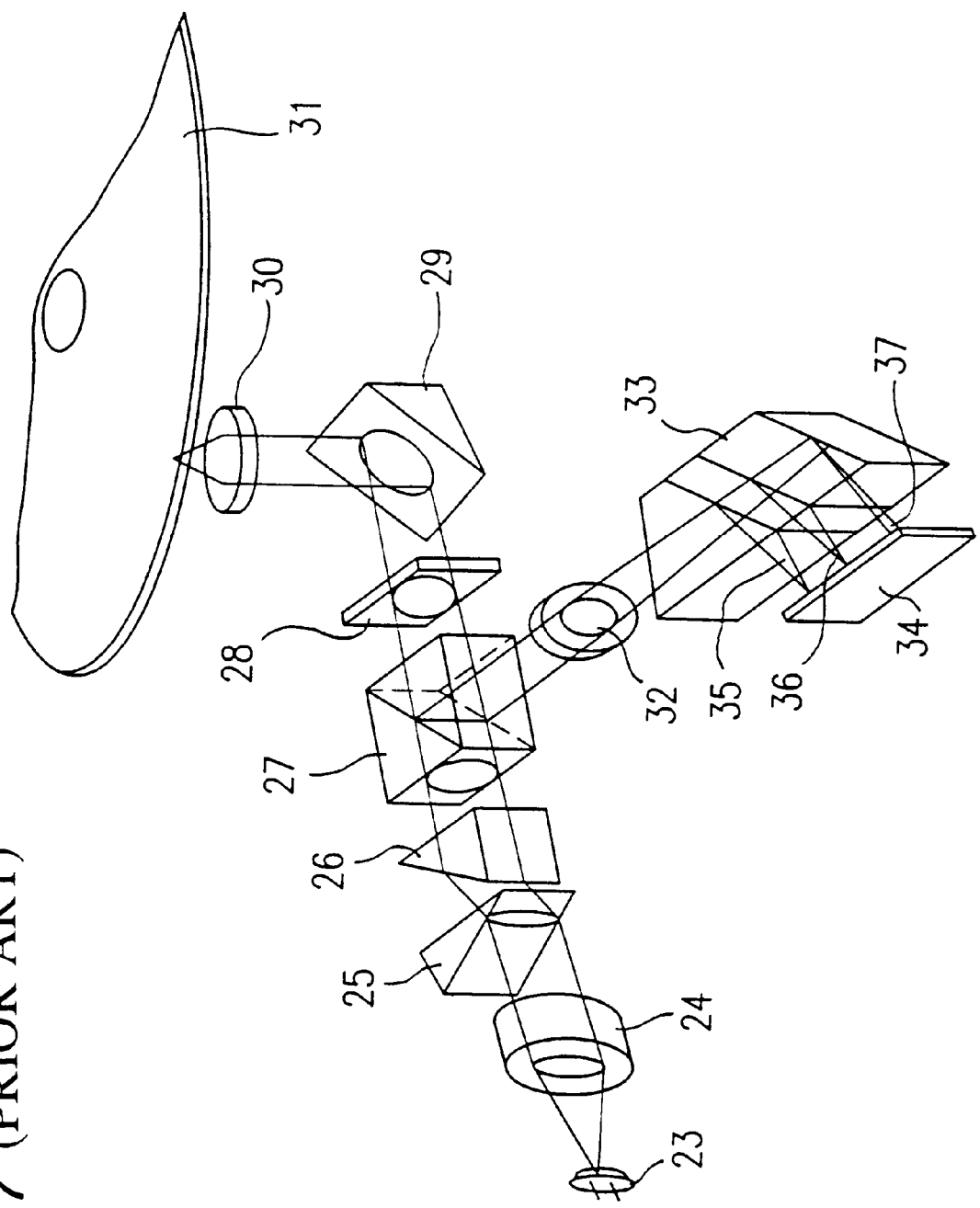
FIG. 7 is a perspective view illustrating a structure of a conventional optical head device.
Figure 8:
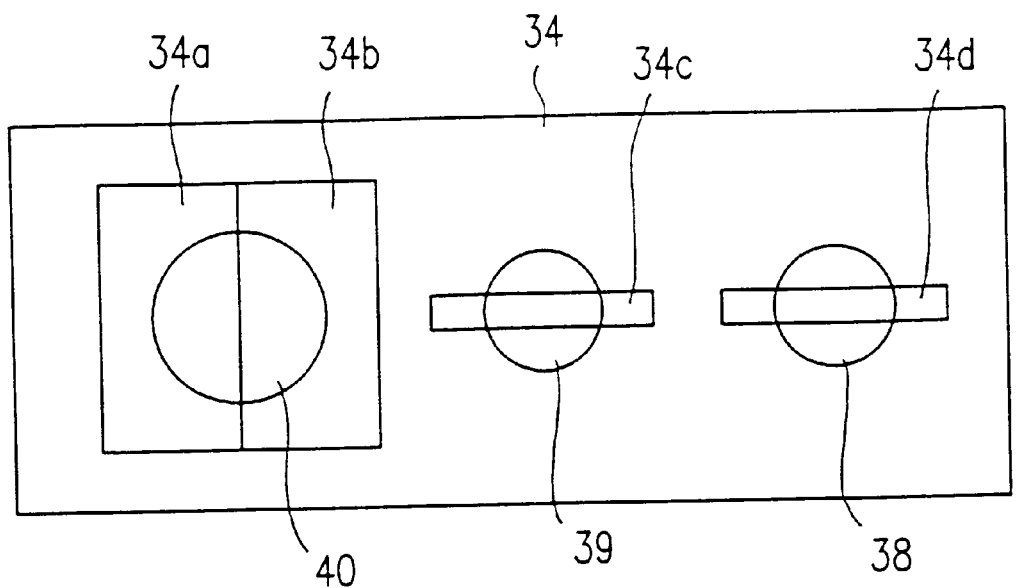
FIG. 8 is a diagram illustrating light receiving areas of a photodetector 34.

FIG. 6 shows the defocusing characteristic of the focusing error signal FE calculated in accordance with Example 1 of the present invention, in comparison with that calculated in accordance with the conventional example. It is assumed that the same focal distance of the detection lens, the same signal detection prism and the same photodetector are used in both calculations.

In the calculations, the width of the light receiving area of the photodetector is about 0.41 mm in the vertical direction, and is assumedly infinite in the horizontal direction; the focal distance of the collimator lens is about 13.5 mm; the focal distance of the objective lens is about 3.9 mm; and the NA of the objective lens is about 0.5. The beam expanding ratio of the beam shaping prism is about ×2 in the vertical direction.

As is apparent from FIG. 6, the optical head device 100 of Example 1 is superior in that the sensitivity of the focusing error signal FE is improved from that of the conventional example by the beam expanding ratio of the beam shaping prism employed in Example 1. Of course, a similar effect is realized also in accordance with Example 2.

In accordance with the present invention, any light beam parallel to the optical information recording medium has an elliptic beam shape with the short axis thereof corresponding to the thickness direction of the optical head device. As a result, it is possible to reduce the dimension of each of the optical elements, except for the objective lens, in the thickness direction of the optical head device.

Moreover, the detection sensitivity of the focusing error signal by the photodetector is improved by the beam expanding ratio of the beam shaping prism. As a result, it is possible to reduce the focal distance of the collimator lens by the inverse number of the beam expanding ratio of the beam shaping prism, thereby reducing the size of the optical head device.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical head device, comprising:

a semiconductor laser for emitting an elliptical light beam;

a first optical element for converting the light beam emitted from the semiconductor laser into collimated light having an elliptic beam shape;

shaping means for shaping the beam shape of the collimated light from an ellipse to a circle, the shaping means being an optical element having functions of: changing a direction of incident light so that an optical axis of an exiting light is perpendicular to an optical axis of the incident light, and shaping the beam shape of the incident light; and a second optical element for directing the collimated light having the beam shape which has been shaped into a circle onto an optical information recording medium, wherein the semiconductor laser is located so that a short axis direction of the ellipse is substantially parallel to a rotation axis direction of the optical information recording medium.

2. An optical head device according to claim 1, wherein the shaping means is located so that both of the light beam emitted from the semiconductor laser and a reflected light beam from the optical information recording medium pass through the shaping means.

3. An optical head device according to claim 1, wherein the shaping means shapes a beam shape of a reflected light beam from the optical information recording medium from a circle to an ellipse, with the short axis direction of the ellipse being substantially parallel to the rotation axis direction of the optical information recording medium.

4. An optical head device according to claim 3, wherein:

the optical head device further includes a photodetector for receiving a light beam having a beam shape which has been shaped into an ellipse; and the photodetector has a light receiving area extending along a long axis direction of the ellipse.

5. An optical head device, comprising:

a semiconductor laser for emitting an elliptical light beam;

a first optical element for converting the light beam emitted from the semiconductor laser into collimated light having an elliptic beam shape;

shaping means for shaping the beam shape of the collimated light from an ellipse to a circle, the shaping means shaping a beam shape of a reflected light beam from an optical information recording medium from a circle to an ellipse, with the short axis direction of the ellipse being substantially parallel to the rotation axis direction of the optical information recording medium;

a second optical element for directing the collimated light having the beam shape which has been shaped into a circle onto the optical information recording medium, wherein the semiconductor laser is located so that a short axis direction of the ellipse is substantially parallel to a rotation axis direction of the optical information recording medium; and a photodetector for receiving a light beam having a beam shape which has been shaped into an ellipse and having a light receiving area extending along a long axis direction of the ellipse.

* * * * *